(12) United States Patent
Lohmann et al.

(10) Patent No.: US 9,045,238 B2
(45) Date of Patent: Jun. 2, 2015

(54) APPARATUS AND METHOD FOR FUELLING AN AIRCRAFT TANK SYSTEM

(75) Inventors: Juergen Lohmann, Hamburg (DE); Juergen Hintze, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1280 days.

(21) Appl. No.: 12/745,371

(22) PCT Filed: Nov. 29, 2007

(86) PCT No.: PCT/EP2007/010380
§ 371 (c)(1),
(2), (4) Date: Oct. 25, 2010

(87) PCT Pub. No.: WO2009/068066
PCT Pub. Date: Jun. 4, 2009

(65) Prior Publication Data
US 2011/0030839 A1    Feb. 10, 2011

(51) Int. Cl.
| | | |
|---|---|---|
| *B65B 1/30* | (2006.01) | |
| *B64F 1/28* | (2006.01) | |
| *B67D 7/32* | (2010.01) | |
| *G01F 23/14* | (2006.01) | |

(52) U.S. Cl.
CPC . *B64F 1/28* (2013.01); *G01F 23/14* (2013.01); *B67D 7/3209* (2013.01)

(58) Field of Classification Search
CPC ........................................................ G01F 23/14
USPC ................. 141/4, 45, 95, 192, 286, 290, 302; 222/318, 424; 73/49.2, 49.8
See application file for complete search history.

(56) References Cited

U.S. PATENT DOCUMENTS

| | | |
|---|---|---|
| 3,169,667 A | 2/1965 | Headrick |
| 6,425,293 B1 * | 7/2002 | Woodroffe et al. ............. 73/756 |

(Continued)

FOREIGN PATENT DOCUMENTS

| | | |
|---|---|---|
| DE | 23 39 327 A1 | 2/1974 |
| DE | 23 39 327 | 2/1975 |

(Continued)

OTHER PUBLICATIONS

International Search Report and Written Opinion, PCT/EP2007/010380, Airbus Deutschland GmbH, The International Searching Authority/European Patent Office, Aug. 22, 2008.

(Continued)

*Primary Examiner* — Jason K Niesz
(74) *Attorney, Agent, or Firm* — Krieg DeVault LLP

(57) ABSTRACT

An apparatus (10) for fuelling an aircraft, in particular during performing a tank leakage test on the aircraft, comprises a fuel supply line (14) for supplying fuel to an aircraft tank system (12), at least one pressure sensor (26) for sensing a pressure within the aircraft tank system (12) and for providing a signal indicative of the pressure within the aircraft tank system (12), an electronic control unit (ECU) for processing the signal of the pressure sensor (26) and for generating an emergency shut-off signal, if the pressure within the aircraft tank system (12) exceeds a first predetermined level, and an emergency shut-off device (24) which is controlled by the electronic control unit (ECU) and which is adapted to interrupt the supply of fuel to the aircraft tank system (12) in response to the emergency shut-off signal from the electronic control unit (ECU).

20 Claims, 1 Drawing Sheet

(56) References Cited

U.S. PATENT DOCUMENTS

| | | | |
|---|---|---|---|
| 7,591,290 B2* | 9/2009 | Bourgeois et al. | 141/83 |
| 8,453,688 B2* | 6/2013 | Allidieres | 141/192 |
| 2004/0045625 A1* | 3/2004 | Gray et al. | 141/4 |
| 2007/0089491 A1 | 4/2007 | Dumortier et al. | |
| 2009/0229701 A1* | 9/2009 | Allidieres et al. | 141/2 |

FOREIGN PATENT DOCUMENTS

| | | |
|---|---|---|
| EP | 0385 046 | 5/1990 |
| JP | 559-72200 | 5/1984 |
| JP | H02-267327 | 11/1990 |
| JP | 06 156599 A | 6/1994 |
| JP | H06-156599 | 6/1994 |
| RU | 2083966 C1 | 7/1997 |
| RU | 2234441 C1 | 8/2004 |
| RU | 2260705 C2 | 9/2005 |

OTHER PUBLICATIONS

JP 06 156599 Patent Abstract, Mar. 6, 1994, Showa Aircraft Ind. Co. Ltd.
International Search Report, PCT/EP2007/010380, Aug. 13, 2008, Airbus Deutschland GmbH.
Written Opinion, PCT/EP2007/010380, Aug. 13, 2008, Airbus Deutschland GmbH.
English language translation of Decision on Granting a Patent for Invention from the Russian Federal Service for Intellectual Property, Patents and Trademarks, Application No. 2010122816/11 (032498), Nov. 11, 2011.
English language abstract for JP H06-156599, Jun. 3, 1994.
Japan Notice of Reasons for Rejection (Office Action) for Application No. 2010-535231 issued May 22, 2012 with English translation.

* cited by examiner

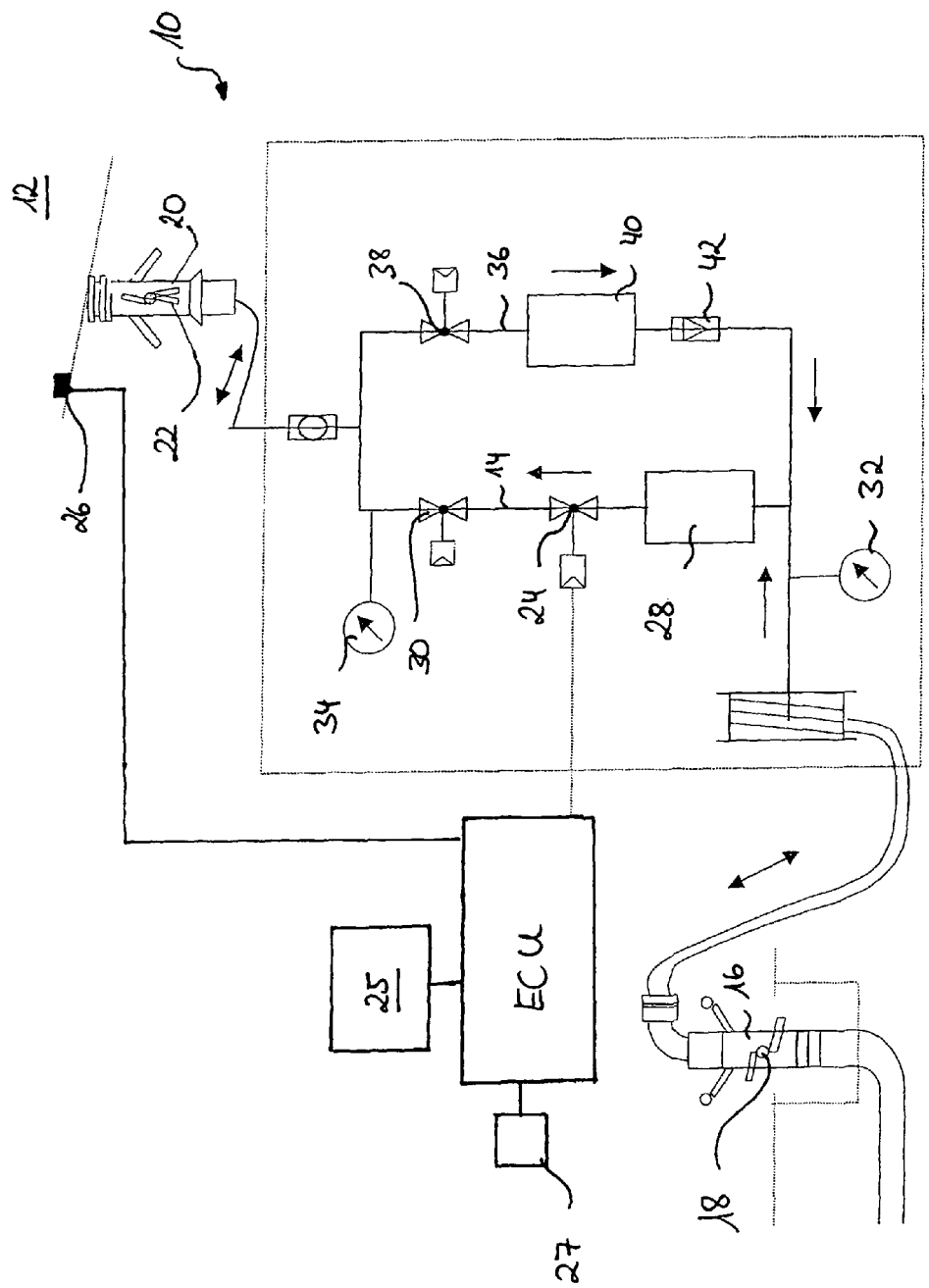

APPARATUS AND METHOD FOR FUELLING AN AIRCRAFT TANK SYSTEM

CROSS REFERENCE TO RELATED APPLICATIONS

The present application is a §371 national stage patent application of PCT/EP2007/010380, filed Nov. 29, 2007, which is incorporated herein by reference.

The invention is directed to an apparatus and a method for fuelling an aircraft tank system, in particular during performing a tank leakage test.

During final assembly of an aircraft a tank leakage test is performed so as to test the proper operation of the aircraft tanks. In particular, the test is performed to discover leakages within the tank system. The tank leakage test typically involves generating a predefined pressure level within the tanks which might even exceed a maximum pressure level admissible during normal operation of the aircraft. An increase of the pressure within the tanks above the predefined level, e.g. due to defects of individual components or due to defects in assembling of the tank system, however, might lead to safety critical situations.

The present invention is directed to the problem to provide an apparatus and a method for fuelling an aircraft tank system, in particular during performing a tank leakage test, which allow to enhance safety during the fuelling operation.

In the context of the present invention the term "fuelling" should not be restricted to an operation of filling the aircraft tanks with fuel. Instead, a "fuelling" operation in the sense of the present invention might include a step of filling the aircraft tanks with fuel, a step of maintaining the fuel within the tanks for a predetermined period of time and also a step of defuelling the aircraft tanks, i.e. a step of removing the fuel from the aircraft tanks. Furthermore, the term "fuel" should not be interpreted in a way to be restricted to typical aircraft fuels, like e.g. kerosene. Instead the term "fuel" the sense of the present invention should also include substitute fluids, which preferably have a flash point >100° C.

To solve the above problem, an inventive apparatus for fuelling an aircraft tank system, in particular during performing a tank leakage test, comprises a fuel supply line for supplying fuel to the aircraft tank system. The fuel supply line might e.g. be a flexible tubing of any desired length which is made of a material resistant to the fuel. The fuel can be a typical aircraft fuel, like e.g. kerosene or a substitute fluid. Furthermore, the inventive apparatus comprises at least one pressure sensor for sensing a pressure within the aircraft tank system and for providing a signal indicative of the pressure within the aircraft tank system. Preferably, for enhanced reliability, a plurality of pressure sensor, e.g. two or four pressure sensors is provided.

An electronic control unit of the inventive apparatus is adapted for receiving and processing the signal of the pressure sensor and for generating an emergency shut-off signal, if the pressure within the aircraft tank system exceeds a first predetermined level. Finally, an emergency shut-off device is provided which is controlled by the electronic control unit and which is adapted to interrupt the supply of fuel to the aircraft tank system in response to the emergency shut-off signal from the electronic control unit. The emergency shut-off device might e.g. be an automatic valve disposed in the fuel supply line, which interrupts the supply of fuel to the aircraft tank system via the fuel supply line, if the pressure within the aircraft tank system during fuelling the tank system exceeds the first predetermined level. The inventive apparatus reliably ensures that the pressure within the aircraft tank system during fuelling the tank system upon performing a tank leakage test does not exceed the predetermined level. As a result, the overall safety during performing the test can be significantly enhanced. Furthermore, damages on the tank system and the aircraft due to excess fuel pressure within the tank system can be avoided.

Preferably, a first end of the fuel supply line is connectable to a fuel reservoir via a first coupling member. The fuel reservoir might be a stationary reservoir. The first end of the fuel supply line of the inventive apparatus, however, might also be connectable to a mobile fuel reservoir, e.g. a fuelling vehicle. The first coupling member preferably is provided with a valve which might be manually operable, e.g. by means of a suitable lever. In its closed state, the valve prevents the supply of fuel from the fuel reservoir to the fuel supply line, whereas the valve in its open state allows fuel to be supplied from the reservoir to the fuel supply line. Similarly, the second coupling member might also be provided with a valve which might be manually operable, e.g. by means of a suitable lever. In its closed state, the valve prevents the supply of fuel from the fuel supply line to the aircraft tank system, whereas the valve in its open state allows fuel to be supplied from the fuel supply line to the aircraft tank system.

The electronic control unit might further be adapted to generate a warning signal, if the pressure within the aircraft tank system exceeds a second predetermined level. During fuelling the aircraft tank system upon performing a tank leakage test on the aircraft the second predetermined pressure level might be selected to be lower than the first predetermined level but higher than the pressure level within the aircraft tank system under normal test conditions. The warning signal might be transmitted to a warning signal output device, e.g. a horn and/or a warning light, which serves to output a visible and/or an acoustic signal in response to the warning signal from the electronic control unit. By outputting a visible and/or an acoustic warning signal the attention of an operator of the inventive apparatus is drawn to the fact, that an excess pressure is sensed within the aircraft tank system. The operator then is alerted and can take the necessary steps, e.g. manually push an emergency shut-off button in case of a further undesired pressure increase within the aircraft tank system.

A preferred embodiment of the inventive apparatus includes a compressed air supply device for supplying compressed air to the aircraft tank system. In particular, the compressed air is supplied to the aircraft tank system after filling up the tank system with fuel to a predetermined level, e.g. 90%. The compressed air supply device supplies compressed air to the aircraft tank system until the pressure within the aircraft tank system, i.e. the sum of the static pressure of the fuel and the air pressure above the fuel surface which is measured by means of the pressure sensor reaches a predefined level. The predefined pressure level within the aircraft tank system might be in the range of 300 to 400 mbar, preferably approximately 350 mbar. This pressure level is particular suitable to detect leakages within the aircraft tank system.

In a preferred embodiment of the present invention the pressure sensor is adapted to be removably connected to a water drain valve provided on the aircraft tank system. The pressure sensor might be adapted to be disposed within a housing of a water drain valve provided on the aircraft tank system. Alternatively, the pressure sensor might be adapted to be connected to an outer part of the water drain valve.

The water drain valve usually is disposed at the bottom of the aircraft tanks and accessible from outside the aircraft to allow the removal of condensation water from the aircraft tanks. By providing a pressure sensor which might be inserted into the housing of the water drain valve after simply removing the water drain valve body, the pressure sensor can easily be installed from outside the aircraft. An installation of the pressure sensor inside the aircraft tank system thus can be omitted. Since the water drain valve usually is disposed at the lowest point of the tank system, positioning the sensor within the housing of this valve, also allows a particular reliable and exact measuring of the pressure within the tank.

The emergency shut-off device might further be adapted to control the flow rate and/or the pressure of the fuel supplied to the aircraft tank system. For enhanced safety, preferably a mechanical emergency shut-off device which might be pneumatically actuatable is used. It is, however, also possible to use an emergency shut-off device e.g. in the form of an electromagnetically controlled valve with a variable flow cross section. The emergency shut-off device then might also be controlled in response to respective control signals provided by the electronic control unit.

A first pressure gauge preferably is disposed in the fuel supply line upstream of the emergency shut-off device. The first pressure gauge allows to determine the fuel pressure within the fuel supply line which is provided by a pump typically disposed in the vicinity of the reservoir. A second pressure gauge might be disposed in the fuel supply line downstream of the emergency shut-off device. The second pressure gauge allows to monitor the fuel pressure within the fuel supply line which is controlled by means of the emergency shut-off device.

In a preferred embodiment the inventive apparatus further comprises a fuel supply valve disposed in the fuel supply line. In its open state the fuel supply valve allows the supply of fuel to the aircraft tank system and in its closed state the fuel supply valve prevents the supply of fuel to the aircraft tank system. The fuel supply valve might be a manually operable valve which e.g. is disposed in the fuel supply line downstream of the emergency shut-off device. The presence of the fuel supply valve further adds to the safety of the overall system. Furthermore, during defuelling the aircraft tank system the fuel supply valve is closed, so that the discharge of fuel from the aircraft tank system to fuel supply line can reliably be avoided.

A first filter might be disposed in the fuel supply line, e.g. upstream of the emergency shut-off device. The first filter might be provided with a differential pressure sensing device so as to detect choking or other malfunctions of the first filter. The presence of the first filter ensures that particulate impurities within the fuel are not introduced into the aircraft tanks. This is particular important, if the fuel supplied to the aircraft tank system for testing purposes is reused several times and thus contains more impurities than fresh fuel.

If the inventive apparatus is used for testing purposes, e.g. to perform leakage tests on an aircraft tank system, the apparatus further preferably comprises a defuel line for defuelling the aircraft tank system. After completion of a leakage test the aircraft then might be defuelled via the defuel line. The fuel might be directed back to the fuel reservoir and reused for further tests. Preferably the defuel line branches of the fuel supply line, so that only one fluid connection of the line system of the inventive apparatus to the fuel reservoir and only one fluid connection of the line system of the inventive apparatus to the aircraft tank system is required.

The apparatus might further comprise a venting device for venting the aircraft tank system. For example the venting device comprises a venting line in which a venting valve is disposed. If the inventive apparatus is used to perform an aircraft tank leakage test, the venting device is used to vent the aircraft tank system during fuelling the tank system and in particular prior to defuelling the aircraft tank system at the end of a test.

A defuel valve might be disposed in the defuel line which in a first state is adapted to allow the defuelling of the aircraft tank system and which in a second state is adapted to prevent the defuelling of the aircraft tank system. Like the fuel supply valve, the defuel valve might be a manually operable valve. Upon defuelling the aircraft tanks the defuel valve thus can be opened, whereas the fuel supply valve is closed, so that the fuel removed from the aircraft tanks is directed back to the fuel reservoir via the defuel line.

A second filter might be disposed in the defuel line, e.g. downstream of the defuel valve. Like the first filter, the second filter might be provided with a differential pressure sensing device so as to detect choking or other malfunctions of the second filter. The presence of the second filter ensures that particulate impurities which might be flushed from the aircraft tanks, in particular if newly assembled aircrafts are fuelled by means of the inventive apparatus, are not introduced into the fuel reservoir. This is particular important, if the fuel supplied to the aircraft tank system for testing purposes should be reused several times.

Finally, a check valve might be disposed in the defuel line. Preferably the check valve is disposed in the defuel line downstream of the defuel valve and the second filter. During fuelling of the aircraft tanks the check valve prevents fuel from flowing through the defuel line so that the fuel is supplied to the aircraft tank system exclusively via the fuel supply line.

An inventive method for fuelling an aircraft tank system, in particular during performing a tank leakage test, comprises the steps of supplying fuel to the aircraft tank system via a fuel supply line, sensing a pressure within the aircraft tank system and providing a signal indicative of the pressure within the aircraft tank system by means of a pressure sensor. The signal of the pressure sensor is processed by means of an electronic control unit so as to generate an emergency shut-off signal, if the pressure within the aircraft tank system during fuelling the aircraft tank system exceeds a first predetermined level. The emergency shut-off device is controlled by means of the electronic control unit so as to interrupt the supply of fuel to the aircraft tank system in response to the emergency shut-off signal from the electronic control unit.

The electronic control unit further generates a warning signal, if the pressure within the aircraft tank system exceeds a second predetermined level. The warning signal might be transmitted to a warning signal output device, e.g. a horn and/or a warning light, which outputs a visible and/or an acoustic signal in response to the warning signal from the electronic control unit. During fuelling the aircraft tank system upon performing a tank leakage test on the aircraft the second predetermined pressure level might be selected to be lower than the first predetermined level but higher than the pressure level within the aircraft tank system under normal test conditions.

A preferred embodiment of the inventive method for fuelling an aircraft tank system, which is particular suitable for performing a leakage test on a tank system of the aircraft, involves the step of filling up the aircraft tank system with fuel to a predetermined fuel level. Preferably the aircraft tanks are fuelled until the tanks are filled up to 90%. Thereafter, compressed air is supplied to the aircraft tank system until the pressure within the aircraft tank system, i.e. the sum of the static pressure of the fuel and the air pressure above fuel surface reaches a predefined level. The predefined pressure level within the aircraft tank system might be in the range of 300 to 400 mbar, preferably approximately 350 mbar. This pressure level is particular suitable to detect leakages within the aircraft tank system.

After filling the aircraft tanks with fuel and compressed air, the pressure within the aircraft tank system might be maintained at the predefined level, i.e. preferably approximately 350 mbar for a predetermined period of time. In a preferred embodiment of the inventive method the pressure is maintained for one hour.

Preferably the inventive method of fuelling an aircraft tank system further comprises the step of removably connecting the pressure sensor to a water drain valve provided on the aircraft tank system.

Furthermore, the method might comprise the step of controlling the emergency shut-off device so as to control the flow rate and/or the pressure of the fuel supplied to the aircraft tank system.

The supply of fuel to the aircraft tank system might be controlled by means of a fuel supply valve disposed in the fuel supply line which in a first state allows the supply of fuel to the aircraft tank system and which in a second state prevents the supply of fuel to the aircraft tank system.

The inventive method preferably comprises the step of filtering the fuel supplied to the aircraft tank system via the fuel supply line so as to avoid the introduction of particulate impurities into the tank system.

Furthermore, the inventive method might comprise the step of defuelling the aircraft tank system via a defuel line branching of the fuel supply line. Prior to defuelling the aircraft tank system the aircraft tank system might be vented.

The defuelling of the aircraft tank system might be controlled by means of a defuel valve disposed in the defuel line which in a first state allows the defuelling of the aircraft tank system and which in a second state prevents the defuelling of the aircraft tank system.

Preferably the fuel defuelled from the aircraft tank system via the defuel line is filtered so as to prevent the flushing of particulate impurities from the aircraft tank system into the fuel reservoir.

The present invention now is explained in detail with reference to the schematic drawing showing a preferred embodiment of an inventive apparatus for fuelling an aircraft tank system.

An apparatus 10 for fuelling an aircraft tank system 12 which is in particular suitable for performing a leakage test on the aircraft tank system 12 comprises a fuel supply line 14 for supplying fuel to the aircraft tank system 12. A first end of the fuel supply line 14 is connected to a stationary fuel reservoir (not shown in the drawing) via a first coupling member 16. A pump (not shown in the drawing) disposed in the vicinity of the reservoir serves to deliver fuel from the reservoir to the aircraft tank system 12 via the fuel supply line 14. The first coupling member 16 is provided with a manually operable valve 18. In its closed state, the valve 18 prevents the supply of fuel from the fuel reservoir to the fuel supply line 14, whereas the valve 18 in its open state allows fuel to be supplied from the reservoir to the fuel supply line 14.

A second end of the fuel supply line 14 is connected to the aircraft tank system 12 via a second coupling member 20. Similar to the first coupling member 16, the second coupling member 20 also is provided with a manually operable valve 22. In its closed state, the valve 22 prevents the supply of fuel from the fuel supply line 14 to the aircraft tank system, whereas the valve 22 in its open state allows fuel to be supplied from the fuel supply line 14 to the aircraft tank system 12.

The apparatus 10 further includes a compressed air supply device for supplying compressed air to the aircraft tank system 12. The compressed air supply device is not depicted in the drawing and includes a compressed air source connected to the aircraft tank system 12 via an air supply line. An air supply valve is disposed in the air supply line which in its closed state prevents the supply of air to the aircraft tank system 12 and which in its open state allows compressed air to be supplied to the aircraft tank system 12.

An emergency shut-off device 24 formed by a mechanical valve with a variable flow cross section is disposed in the fuel supply line 14. The pneumatically actuatable valve forming the emergency shut-off device 24 is adapted to vary the flow rate and/or the pressure of the fuel supplied to the aircraft tank system 12 via the fuel supply line 14 by varying the flow cross section of the valve. The emergency shut-off device 24 is connected to the electronic control unit ECU which is further connected to a control panel 25 provided with a emergency shutoff-button and a display unit.

A pressure sensor 26 serves to measure the pressure within the aircraft tank system 12. The pressure sensor 26 is removably disposed within a housing of a water drain valve provided on the aircraft tank system 12. The water drain valve is disposed at a bottom of the aircraft tank system 12 and accessible from outside the aircraft. The pressure sensor 26 thus can be inserted into the housing of the water drain valve after removing the water drain valve body. Signals generated by the pressure sensor 26 which are indicative of the pressure within the aircraft tank system 12 are transmitted to the electronic control unit ECU. The electronic control unit ECU is adapted to process the signals received from the pressure sensor 26 for controlling a warning signal output device 27 and the emergency shut-off device 24 in dependence on the pressure signals provided to the electronic control unit ECU by the pressure sensor 26.

A first filter 28 is disposed in the fuel supply line 14 upstream of the emergency shut-off device 24. The first filter 28 is provided with a differential pressure sensing device so as to detect choking or other malfunctions of the first filter 28. The first filter 28 serves to prevent particulate impurities within the fuel to be introduced into the aircraft tank system 12.

Furthermore, a manually operable fuel supply valve 30 is disposed in the fuel supply line downstream of the emergency shut-off device 24. In a first open state the fuel supply valve 30 allows the supply of fuel to the aircraft tank system 12 and in a second closed state the fuel supply valve 30 prevents the supply of fuel to the aircraft tank system 12.

A first pressure gauge 32 is disposed in the fuel supply line 14 upstream of the emergency shut-off device 24. The first pressure gauge 32 allows to determine the fuel pressure within the fuel supply line 14 which is provided by the pump disposed in the vicinity of the reservoir. A second pressure gauge 34 is disposed in the fuel supply line 14 downstream of the emergency shut-off device 24. The second pressure gauge 34 allows to monitor the fuel pressure within the fuel supply line 14 which is controlled by means of the emergency shut-off device 24 in response to control signal provided by the electronic control unit ECU.

The apparatus 10 intended to be used for tank leakage testing purposes further comprises a defuel line 36 for defuelling the aircraft tank system 12. Via the defuel line 36 which branches of the fuel supply line 14 fuel can be directed from the aircraft tank system 12 back to the reservoir where it can be stored and reused for further tests.

Furthermore, a venting device for venting the aircraft tank system 12 during fuelling the tank system 12 and in particular prior to defuelling the aircraft tank system 12 is provided (not shown in the drawing). The venting device comprises a venting line connected to the aircraft tank system 12 in which a venting valve, an overpressure safety valve and an underpressure safety valve are disposed. Furthermore, the venting device comprises a connecting means for connecting the venting device to an air pressure test station via a respective tubing.

A manually operable defuel valve 38 is disposed in the defuel line 36. In a first open state the defuel valve 38 allows the defuelling of the aircraft tank system 12 and in a second closed state the defuel valve 38 prevents the defuelling of the aircraft tank system 12.

To avoid the flushing of particulate impurities from the aircraft tank system 12 into the reservoir, a second filter 40 is disposed in the defuel line 36 downstream of the defuel valve 38. Like the first filter 28, the second filter 40 also is provided with a differential pressure sensing device so as to detect choking or other malfunctions of the second filter 40.

Finally, a check valve 42 is disposed in the defuel line 36 downstream of the defuel valve 38 and the second filter 40. During fuelling the aircraft tanks 12 the check valve 42 prevents fuel from flowing through the defuel line 36 so that the fuel is supplied to the aircraft tank system 12 exclusively via the fuel supply line 14.

For performing a test to discover leakages within the tank system 12 of the aircraft the first end of the fuel supply line 14 is connected to the fuel reservoir via the first coupling member 16. The second end of the fuel supply line 14 is connected to the aircraft tank system 12 via the second coupling member 20. The valves 18, 22 provided in the first and second coupling members 16, 20 are manually brought into their open state to allow the supply of fuel from the reservoir to the fuel supply line 14 and the supply of fuel from the fuel supply line 14 to the aircraft tank system 12, respectively.

A water drain valve body is removed from the housing of the water drain valve disposed at the bottom of the aircraft tank system 12. Thereafter, the pressure sensor 26 is inserted into the valve housing from outside the aircraft for sensing the pressure within the aircraft tank system 12.

To start the test, the fuel supply valve 30 is manually opened, whereas the defuel valve 38 and the air supply valve provided are maintained in their closed state. The venting valve is maintained in its open state. The pump is activated so that fuel is delivered from the fuel reservoir to the aircraft tank system 12 via the fuel supply line 14. The check valve 42 provided in the defuel line 36 prevents fuel from flowing through the defuel line 36 during the fuelling operation. The first filter 28 provided in the fuel supply line 14 ensures that particulate impurities within the fuel are prevented to be introduced into the aircraft tank system 12.

The aircraft tanks 12 are fuelled until the tanks 12 are filled up to 90%. Thereafter, the fuel supply valve 30 and the venting valve are closed, whereas the air supply valve is opened so as to supply compressed air to the aircraft tank system 12 until the pressure within the aircraft tank system 12, i.e. the sum of the static pressure of the fuel and the air pressure above fuel surface reaches a predefined level of approximately 350 mbar. Thereafter, the air supply valve is closed and the pressure is maintained at the predefined level of approximately 350 mbar for one hour. During this pressure holding phase the pressure within the aircraft tank system 12 is continuously readjusted, wherein pressure adjustment operations might involve a reopening of the air supply valve and the supply of additional compressed air to the aircraft tank system 12.

During fuelling the aircraft tanks 12 the emergency shut-off device 24 controls the flow rate and/or the pressure of the fuel supplied to the aircraft tank system 12 via the fuel supply line 14. The emergency shut-off device 24 is controlled by the electronic control unit ECU in dependence on pressure signals provided to the electronic control unit ECU by the pressure sensor 26. The pressure values sensed by the pressure sensor 26 are continuously displayed on the display unit of the control panel 25. The fuel pressure within the fuel supply line 14 which is provided by the pump disposed in the vicinity of the reservoir can be monitored by means of the first pressure gauge 32. The second pressure gauge 34 allows to monitor the fuel pressure within the fuel supply line 14 downstream of the emergency shut-off device 24.

If the pressure within the aircraft tank system 12 during fuelling the aircraft tank system 12 exceeds a first predetermined level, the electronic control unit ECU controls the emergency shut-off device 24 so as to immediately interrupt the supply of fuel to the aircraft tank system 12. In other words, the valve forming the emergency shut-off device 24 is automatically closed, if the electronic control unit ECU during the fuelling operation provides an emergency shut-off signal to the emergency shut-off device 24 which indicates that the pressure within the aircraft tank system 12 exceeds the first predetermined level.

If the pressure within the aircraft tank system 12 during fuelling the aircraft tank system 12 does not exceed the first predetermined level but a second predetermined level which is selected to be lower than the first predetermined level but higher than the pressure level within the aircraft tank system 12 under normal test conditions, the electronic control ECU generates a warning signal and provides this warning signal to the warning signal output device 27. Upon receiving the warning signal from the electronic control ECU the warning signal output device 27 outputs a visible and/or an acoustic warning signal to draw the attention of an operator of the apparatus 10 to the fact that an excess pressure is sensed within the aircraft tank system 12. The operator then is alerted and can take the necessary steps, e.g. manually push the emergency shut-off button provided on the control panel 25 in case of a further undesired pressure increase within the aircraft tank system 12.

During supplying compressed air to the aircraft tank system 12 the second predetermined pressure level which serves as a threshold value to decide, whether a warning signal is generated by the electronic control unit ECU, is selected to be a time dependent variable. The value of this time dependent variable is derived from a time dependent nominal pressure curve indicating the nominal pressure, i.e. the nominal sum of the static fuel pressure and the air pressure above the fuel surface during supplying compressed air to the aircraft tank system 12. In particular, during supplying compressed air to the aircraft tank system 12 the second predetermined pressure level is selected to be always slightly higher than an associated time dependent nominal pressure value.

During the pressure holding phase the second predetermined pressure level is selected to be slightly higher than the nominal pressure value during this phase, i.e. 350 mbar. By appropriately selecting the value of the second predetermined pressure level, also during supplying compressed air to the aircraft tank system and during the pressure holding phase visible and/or acoustic warning signals are output by the warning signal output device 27 in response to respective warning signals from the electronic control unit ECU.

After maintaining the pressure within the aircraft tank system 12 at the predefined level of approximately 350 mbar for one hour the venting valve is opened. Thereafter, the defuel valve 38 is manually opened, while the fuel supply valve 30 is maintained in its closed state. The aircraft tank system 12 then can be defuelled via the defuel line 36. The fuel removed from the aircraft tank system 12 is filtered by means of the second filter 40 and thereafter directed back to the reservoir where it can be stored an reused for further tests.

The invention claimed is:

1. Apparatus for fuelling an aircraft tank system, in particular during performing a tank leakage test, which comprises:
    a fuel supply line for supplying fuel to the aircraft tank system,
    at least one pressure sensor for sensing a pressure within the aircraft tank system and for providing a signal indicative of the pressure within the aircraft tank system,
    an electronic control unit for processing the signal of the pressure sensor and for generating an emergency shut-off signal, if the pressure within the aircraft tank system exceeds a first predetermined level,
    an emergency shut-off device which is controlled by the electronic control unit and which is adapted to interrupt the supply of fuel to the aircraft tank system in response to the emergency shut-off signal from the electronic control unit; and
    wherein the pressure sensor is adapted to be removably connected to a water drain valve provided on a bottom of the aircraft tank system.

2. Apparatus according to claim 1, wherein the electronic control unit further is adapted to generate a warning signal, if the pressure within the aircraft tank system exceeds a second predetermined level, and wherein the apparatus further comprises a warning signal output device for outputting a visible and/or an acoustic signal in response to the warning signal from the electronic control unit.

3. Apparatus according to claim 1, further comprising a compressed air supply device for supplying compressed air to the aircraft tank system.

4. Apparatus according to claim 1, wherein a first pressure gauge is disposed in the fuel supply line upstream of the emergency shut-off device and a second pressure gauge is disposed in the fuel supply line downstream of the emergency shut-off device.

5. Apparatus according to claim 1, further comprising a fuel supply valve disposed in the fuel supply line.

6. Apparatus according to claim 1, further comprising a first filter disposed in the fuel supply line.

7. Apparatus according to claim 1, further comprising a defuel line branching of the fuel supply line for defuelling the aircraft tank system.

8. Apparatus according to claim 7, further comprising a venting device for venting the aircraft tank system.

9. Apparatus according to claim 7, further comprising a defuel valve disposed in the defuel line which in a first state is adapted to allow the defuelling of the aircraft tank system and which in a second state is adapted to prevent the defuelling of the aircraft tank system.

10. Apparatus according to claim 7, further comprising a second filter disposed in the defuel line.

11. Method for fuelling an aircraft tank system, in particular during performing a tank leakage test, which comprises the steps of:
    removably connecting a pressure sensor to a water drain valve provided on a bottom of the aircraft tank system,
    supplying fuel to the aircraft tank system via a fuel supply line,
    sensing a pressure within the aircraft tank system and providing a signal indicative of the pressure within the aircraft tank system by means of the pressure sensor,
    processing the signal of the pressure sensor by means of an electronic control unit and generating an emergency shut-off signal, if the pressure within the aircraft tank system exceeds a first predetermined level, and
    controlling an emergency shut-off device by means of the electronic control unit so as to interrupt the supply of fuel to the aircraft tank system in response to the emergency shut-off signal from the electronic control unit.

12. Method according to claim 11, further comprising the steps of:
    generating a warning signal by means of the electronic control unit, if the pressure within the aircraft tank system exceeds a second predetermined level, and
    outputting a visible and/or an acoustic signal in response to the warning signal from the electronic control unit by means of a warning signal output device.

13. Method according to claim 11, further comprising the steps of:
    filling up the aircraft tank system with fuel to a predeterminded fuel level, and
    supplying compressed air to the aircraft tank system until the pressure within the aircraft tank system reaches a predefined level.

14. Method according to claim 11, further comprising the step of maintaining the pressure within the aircraft tank system at the predefined level for a predetermined period of time.

15. Method according to claim 11, further comprising the step of controlling the supply of fuel to the aircraft tank system by means of a fuel supply valve disposed in the fuel supply line.

16. Method according to claim 11, further comprising the step of filtering the fuel supplied to the aircraft tank system via the fuel supply line.

17. Method according to claim 11, further comprising the step of defuelling the aircraft tank system via a defuel line branching of the fuel supply line.

18. Method according to claim 17, further comprising the step of venting the aircraft tank system prior to defuelling the aircraft tank system.

19. Method according to claim 17, further comprising the step of controlling the defuelling of the aircraft tank system by means of a defuel valve disposed in the defuel line which in a first state allows the defuelling of the aircraft tank system and which in a second state prevents the defuelling of the aircraft tank system.

20. Method according to claim 17, further comprising the step of filtering the fuel defuelled from the aircraft tank system via the defuel line.

* * * * *